(12) United States Patent
Fenech et al.

(10) Patent No.: US 8,149,869 B2
(45) Date of Patent: Apr. 3, 2012

(54) TELECOMMUNICATION NETWORK

(75) Inventors: Hector Fenech, Issy les Moulineaux (FR); Emmanuel Lance, Clichy (FR)

(73) Assignee: Eutelsat SA, Paris (FR)

( * ) Notice: Subject to any disclaimer, the term of this patent is extended or adjusted under 35 U.S.C. 154(b) by 965 days.

(21) Appl. No.: 12/154,790

(22) Filed: May 27, 2008

(65) Prior Publication Data

US 2009/0239529 A1 Sep. 24, 2009

(30) Foreign Application Priority Data

Mar. 21, 2008 (FR) .................................. 08 51885

(51) Int. Cl.
  *H04J 3/16* (2006.01)
(52) U.S. Cl. ...................................................... 370/465
(58) Field of Classification Search .................. None
  See application file for complete search history.

(56) References Cited

U.S. PATENT DOCUMENTS

| 2002/0052180 A1 | 5/2002 | Ravishankar et al. | 455/12.1 |
| 2005/0118947 A1* | 6/2005 | Ames et al. | 455/12.1 |
| 2005/0272370 A1* | 12/2005 | Schiff | 455/13.3 |

FOREIGN PATENT DOCUMENTS

| WO | WO 0007306 | 2/2000 |
| WO | WO 2004/002016 A2 | 12/2003 |

* cited by examiner

*Primary Examiner* — Raj Jain
(74) *Attorney, Agent, or Firm* — Davidson, Davidson & Kappel, LLC

(57) ABSTRACT

The present invention relates to a telecommunication network for establishing radiofrequency links between gateways and ground terminals via a telecommunication satellite with several spot beams, known as a multispot satellite. The network includes a multispot satellite including a payload for the reception, processing and retransmitting of telecommunication signals received by said satellite, a service area comprised of a plurality of basic coverage areas, known as cells, each cell including a plurality of ground terminals and a plurality $N_{GWactive}$ of active gateways interconnected by a ground network, $N_{GWactive}$ being an integer, said satellite relaying signals sent by said $N_{GWactive}$ active gateways to said cells. Furthermore, the network includes $N_{GW}$ gateways, $N_{GW}$ being an integer strictly greater than the number $N_{GWactive}$ of active gateways, said $N_{GW}$ gateways being interconnected by said ground network and including said $N_{GWactive}$ active gateways such that $N_{GW}-N_{GWactive}$ gateways are not active.

13 Claims, 5 Drawing Sheets

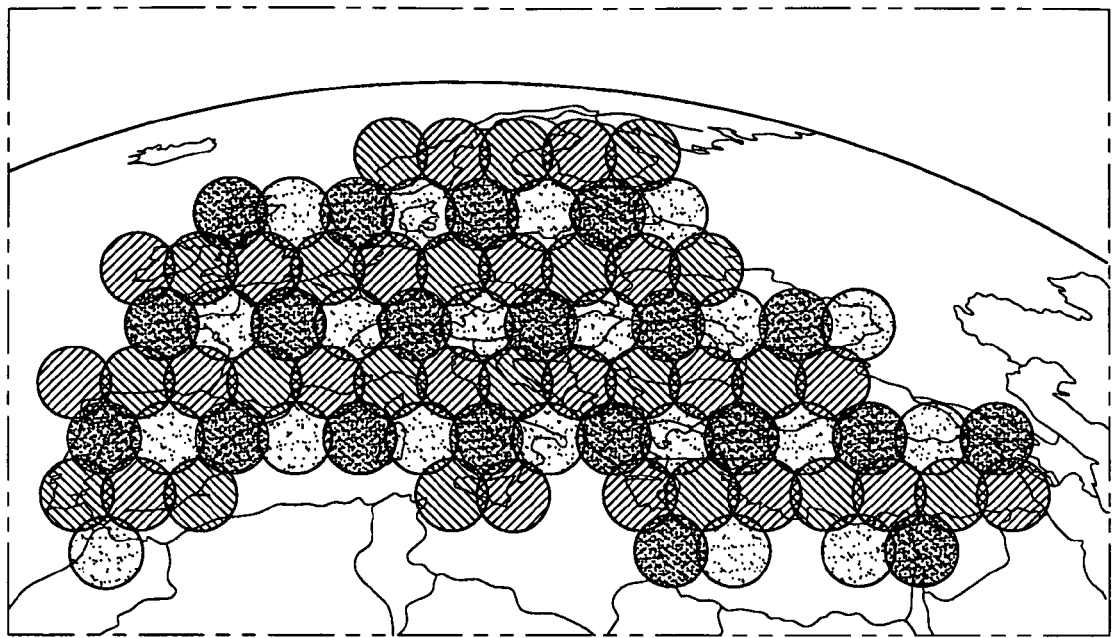
Fig. 3
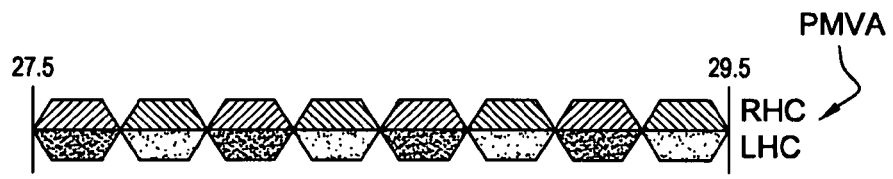
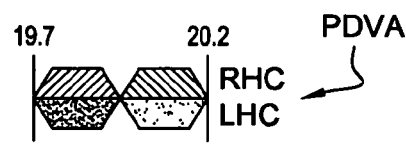
(a)
Fig. 4
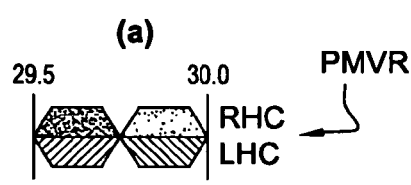
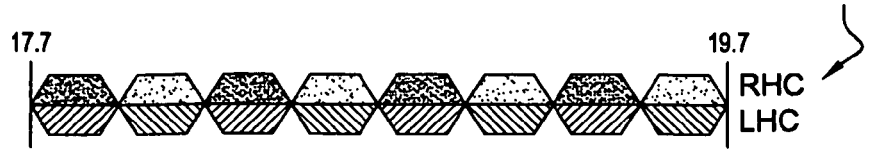
(b)

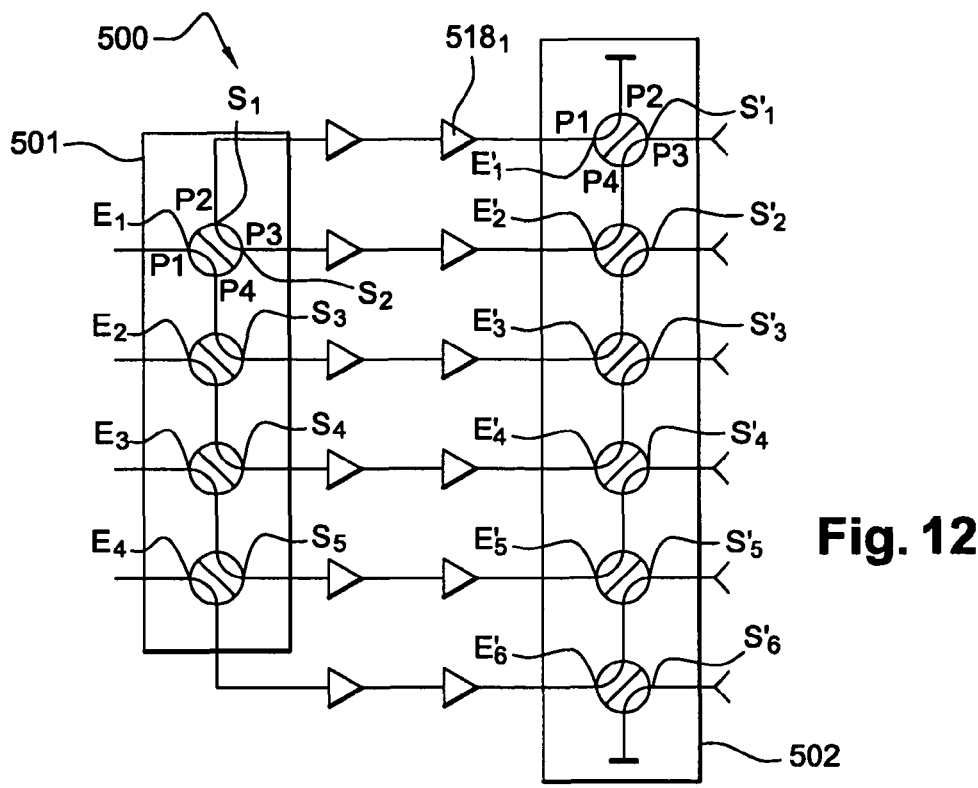

TELECOMMUNICATION NETWORK

This claims priority to French Patent Application FR 08/51885, filed Mar. 21, 2008, the entire disclosure of which is incorporated by reference herein.

BACKGROUND

The present invention relates to a telecommunication network for establishing radiofrequency links between gateways and ground terminals via a multispot telecommunication satellite. This type of satellite enables the use of several spot beams from antennas on board the satellite to cover contiguous geographic areas or cells, instead of a single large spot beam.

Such multispot satellites enable several radiofrequency links occupying the same frequency band on different spot beams to be established.

In the case of a high bandwidth broadband satellite telecommunication system, the satellite is used bidirectionally, that is to both:
 relay data sent by a gateway (connected to the ground network) to a plurality of ground terminals: this first point to multipoint type link constitutes the forward link;
 relay to the gateway data sent by the ground terminals: this second multipoint to point type link constitutes the return link.

It will be noted that a satellite broadcasting service may be considered to be equivalent to the forward link of a bidirectional system as described above.

An example of a forward link in a multispot telecommunication network is illustrated in FIG. 1.

Signals are sent to a multispot satellite 3 over an uplink LM by a gateway 2 (also called a central station) such as a ground communication gateway connected to an Internet backbone 5. The gateway controls the network through a network management system that allows the operator to monitor and control all the components in the network. The signals sent by the gateway are then processed at the level of satellite 3 that amplifies the signals, transposes the signals at a generally lower frequency and then retransmits the signals from the satellite antenna or antennas on a downlink LD in the form of a plurality of spot beams or spots forming basic coverage areas or cells C1 to C8 in which ground terminals 6 are situated. Each cell C1 to C8 is associated with a spot beam SP1 to SP8. It will be noted that, in the case of configuration 1, the eight cells C1 to C8 associated respectively with eight spot beams SP1 to SP8 form a group of cells served by the same gateway 2. In practice, network 1 is formed by a plurality of gateways that are interconnected via a ground network (an Internet network, for example). The return link of ground terminals 6 to gateway 2 operates identically with a reverse direction of communication.

Coordination of frequencies between operators is done in the context of regulation issued by the International Telecommunication Union (ITU): thus, by way of example, the band Ka for region 1 (Europe, Africa, Middle East) is defined in table 1 below:

TABLE 1

| | | |
|---|---|---|
| Forward link | Uplink (from the gateway) | 27.5 GHz to 29.5 GHz |
| | Downlink (to the ground terminals) | 19.7 GHz to 20.2 GHz |
| Return link | Uplink (from the ground terminals) | 29.5 GHz to 30.0 GHz |
| | Downlink (to the gateway) | 17.7 GHz to 19.7 GHz |

It is observed that the spectrums from band Ka in uplink are adjacent (i.e., the intervals [27.5; 29.5] and [29.5; 30.0] do not present any discontinuity). The same is true for spectrums from band Ka in downlink (i.e., the intervals [17.7; 19.7] and [19.7; 20.2] do not present any discontinuity).

Given that the gain from an antenna is inversely proportional to the opening of the spot beam, using multispot antennas to cover an extended area with a homogeneous and elevated gain is necessary. The larger the number of spot beams, the smaller the opening of each spot beam will be. Thus, the gain on each spot beam and so the gain on the service area to cover will be increased. As we mentioned above, a service area to cover is formed by a plurality of contiguous cells (basic coverage areas), one spot beam being associated with each cell. A homogeneous multispot coverage area SA is represented in FIG. 2a), each cell being represented by a hexagon FH such that the coverage area is comprised of a plurality of hexagons FH in which $\theta_{cell}$ is the outer size of the cell expressed by the angle of the satellite associated with the coverage. However, as the antenna spot beam associated with each cell is not capable of producing a hexagonal form, a good approximation consists of considering a plurality of circular spot beams FC such as represented in FIG. 2b). The association of a spot beam with a cell is done by considering the best performance of the satellite for said spot beam, particularly in terms of EIRP (Equivalent Isotropically Radiated Power) and G/T figure of merit (gain to noise temperature ratio): a cell is determined to be the part of the service area associated with the spot beam that offers the highest gain on this area from among all the satellite spot beams.

Configuration 1 such as represented in FIG. 1 uses a technique known as the frequency reuse technique: this technique enables the use of the same frequency range several times in the same satellite system in order to increase the total capacity of the system without increasing the allocated bandwidth.

Frequency reuse schemes, known as color schemes, making one color correspond to each of the satellite spot beams, are known. These color schemes are used to describe the allocation of a plurality of frequency bands to the satellite spot beams in view of radiofrequency transmissions to carry out in each of these spot beams. In these schemes, each color corresponds to one of these frequency bands.

In addition, these multispot satellites enable the sending (and receiving) of polarized transmissions: the polarization may be linear (in this case the two polarization directions are horizontal and vertical, respectively) or circular (in this case the two polarization directions are left circular or right circular, respectively). It will be noted that in the example from FIG. 1, the uplink leaving the gateway 2 uses two polarizations with four channels for each polarization, respectively Ch1 to Ch4 for the first polarization and Ch5 to Ch8 for the second polarization: the use of two polarizations allows the total number of gateways to be reduced. The eight channels Ch1 to Ch8, after processing by the payload of the satellite 3, will form the eight spot beams SP1 to SP8 (one channel being associated with one spot beam in this example).

According to a four-color scheme (red, yellow, blue, green) with a frequency spectrum of 500 MHz for each polarization, the transmissions being polarized in one of two right circular or left circular polarization directions, each color is associated with a 250 MHz band and a polarization direction.

In the rest of the description, we will take the following convention:
 the color red is represented by lines hatched to the right;
 the color yellow is represented by dense dots;
 the color blue is represented by lines hatched to the left;
 the color green is represented by dispersed dots.

A color is thus associated with each satellite spot beam (and thus a cell) such that the spot beams with the same "color" are non-adjacent: contiguous cells thus correspond to different colors.

An example of a four-color scheme for covering Europe is represented in FIG. 3. In this case, 80 cells are necessary to cover Europe.

This type of scheme is applicable equally well in uplink and in downlink. At the satellite level, a spot beam is created from a feedhorn radiating towards a reflector. A reflector may be associated with a color such that four-color coverage is ensured by four reflectors. In other words, the generation of 16 spot beams from each gateway may be done by using four antennas (one per color) each having a reflector, four feedhorns being associated with each reflector.

FIG. 4 illustrates a frequency plan broken down into an uplink frequency plan PMVA on the forward link, a downlink frequency plan PDVA on the forward link, an uplink frequency plan PMVR on the return link and a downlink frequency plan PDVR on the return link. The notations RHC and LHC respectively designate the right and left circular directions of polarization.

The PMVA plan corresponding to the forward uplink (from the gateway to the satellite) disposes 2 GHz (from 27.5 to 29.5 GHz) of available frequency spectrum such that 16 channels of 250 MHz of bandwidth are generated by a gateway (8 channels for each polarization). These 16 channels, after processing by the satellite payload, will form 16 spot beams. The assumption made here consists of considering that the entire 2 GHz spectrum is used: however, it will be noted that it is also possible, particularly for operational reasons, to use only one part of the spectrum and to generate fewer channels. In the example above, 16 spot beams (and thus 16 cells) are generated from two signals multiplexing the 8 channels (a signal multiplexed by polarization) generated by a gateway. Each multiplexed signal corresponding to a polarization is then processed at the satellite transponder level so as to provide 8 spot beams; each of these eight spot beams is associated with a frequency interval among the two frequency intervals [19.7; 19.95] and [19.95; 20.2] and with an RHC or LHC polarization as represented on the downlink frequency plan PDVA.

The PDVR plan corresponding to the return downlink (from the satellite to the gateway) disposes 2 GHz (from 17.7 to 19.7 GHz) of available frequency spectrum such that 16 spot beams of 250 MHz of bandwidth (associated with a frequency interval from among the two frequency intervals [29.5; 29.75] and [29.75; 30.0] and with an RHC or LHC polarization such as represented on the downlink frequency plan PMVR) issued from cells are multiplexed at the satellite level into two signals (corresponding to each polarization) to be returned to the gateway (8 channels for each polarization). We are still assuming that the entire 2 GHz spectrum is used. Thus, in the case of Europe with a spectrum of 2 GHz used, there is a number $N_c$ of cells equal to 80 and a number of active gateways $N_{GWactive}$ equal to 5 (or the number 80 of cells divided by the number 16 of spot beams). It will be noted that It may be that part of the band is not usable, for example the part going from 17.7 to 18.45 GHz in return link and the part going from 27.5 to 28.25 GHz in forward link: in this case, the number of channels Ns per polarization is equal to 5: therefore, the number of cells always being equal to 80 for Europe, the number of active gateways $N_{GWactive}$ becomes equal to 5. In any case, the number of gateways $N_{GWactive}$ is always less than the number $N_c$ of coverage area cells.

For the forward link, each spot beam is associated with one of the four following colors:

a red color corresponding to a first band of 250 MHz (lower part of the available spectrum of 500 MHz) and to the right circular polarization direction;

a yellow color corresponding to the same first band of 250 MHz and to the left circular polarization direction;

a blue color corresponding to a second band of 250 MHz (upper part of the available spectrum of 500 MHz) and to the right circular polarization direction;

a green color corresponding to the same second band of 250 MHz and to the left circular polarization direction; The four adjacent spot beams with the same pattern are each associated with a different color.

On the return link, the polarizations are reversed so that the red and yellow colors have a left circular polarization and the blue and green colors have a right circular polarization. The ground terminals send and receive according to an opposite polarization such that one may easily separate the uplink signals from the downlink signals: such a configuration enables less costly terminals to be used.

The satellite payload designates the part that allows it to fulfill the mission for which it was designed, that is for a telecommunication satellite 3 such as that represented in FIG. 1, to ensure the reception, processing (frequency conversion, filtering, amplification) and resending of telecommunication signals from gateway 2. The payload essentially includes satellite antennas and transponders (and not the equipment for control, propulsion or electrical power equipment which belong to the platform of the satellite).

FIG. 5 represents in a known manner a function block diagram of a payload 10 architecture in forward link (from gateways to cells including ground terminals) with multispot sending over the downlink.

After reception and selection of polarization, $2N_{GWactive}$ multiplexed signals (in the example cited above, $N_{GWactive}$ signals from 8 channels for each of two polarizations) received from $N_{GWactive}$ gateways (or communication gateway) are each amplified by a 12 LNA low noise amplifier. Each signal is then separated into $N_c$ uplink channels by a signal dividing device (demultiplexer) 13. The $N_c$ uplink channels are then translated in frequency by a frequency converter circuit 14 generally formed by a local oscillator and filtered by a receiver filter 15 (of the band-pass filter type) so as to form $N_c$ channels in agreement with the downlink frequency plan on the forward link (PDVA). The $N_c$ translated frequency channels are amplified through a HPA (High Power Amplifier) high power amplifier 16 generally formed by a CAMP (Channel AMPlifier) channel amplifier 17 and a TWTA (Traveling Wave Tube Amplifier) traveling wave tube amplifier 18 forming $N_c$ downlink spot beam signals. Each of the $N_c$ signals is then filtered through a transmit band-pass filter 19 then sent over a feed 20 such as a feedhorn radiating to a reflector for forming a spot beam. According to this functional configuration, the payload 10 comprises:

$2N_{GWactive}$ LNA low noise amplifiers 12;
$2N_{GWactive}$ signal dividing devices 13;
$N_c$ frequency converter circuits 14;
$N_c$ receiver filters 15;
$N_c$ HPA power amplifiers 16;
$N_c$ transmit band-pass filters 19.

FIG. 6 represents in a known manner a function block diagram of a payload 100 architecture in return link (from cells including ground terminals to gateways) with multispot sending over the uplink.

$N_c$ signals received from $N_c$ cells comprising user terminals are each amplified by an LNA (Low Noise Amplifier) low noise amplifier 112. Each signal is then transposed in frequency by a frequency converter circuit 114 generally formed by a local oscillator and filtered by a receiver filter 115 (of the band-pass filter type) so as to form $N_c$ channels in agreement with the downlink frequency plan on the return link (PDVR). The channels intended for the same gateway (for the same polarization) are then regrouped to form a signal multiplexed by a multiplexer 113 (at $N_c$ inputs and $2N_{GWactive}$ outputs): the structure of this multiplexed signal is identical to that of a signal sent by a gateway to the satellite on the forward uplink. Thus there are $2N_{GWactive}$ signals in output from the multiplexer 113. Each of the $2N_{GWactive}$ signals is amplified through a HPA power amplifier 116 generally formed by a CAMP channel amplifier 117 and a TWTA traveling wave tube amplifier 118 forming $2N_{GWactive}$ downlink signals in return link. Each of the $2N_{GWactive}$ return downlink signals is then filtered through a transmit band-pass filter 119 then sent over a radiating device 120 such as a feedhorn radiating to a reflector to form $2N_{GWactive}$ signals to $N_{GWactive}$ gateways. According to this functional configuration, the payload 100 comprising:

$N_c$ LNA low noise amplifiers 112;
$N_c$ frequency converter circuits 114;
$N_c$ receiver filters 115;
A multiplexer device 113 with $N_c$ inputs and $2N_{GWactive}$ outputs;
$2N_{GWactive}$ HPA power amplifiers 116;
$2N_{GWactive}$ transmit band-pass filters 119.

It will be noted that channel amplifiers 17 and/or 117 are generally gain control amplifiers that allow the power level of input signals of traveling wave tubes 18 and/or 118 to be adjusted. Tubes 18 and/or 118 may be replaced by SSPA (Solid State Power Amplifier) solid state power amplifiers. It is also possible to use more sophisticated architectures comprising MPA (Multiport Amplifier) type devices offering more flexibility.

However, payloads 10 and 100 such as presented above may pose several difficulties, particularly in the case of TWTA tube breakdowns.

A known solution to this problem consists of using redundant tubes. Such a configuration is illustrated in FIG. 7. FIG. 7 schematically represents the part 200 of a return link payload situated between the multiplexer and the transmit filter and including CAMPs and redundant TWTA tubes.

As explained above, each of the $2N_{GWactive}$ signals is amplified through an HPA high power amplifier 216 generally formed by a CAMP channel amplifier 217 and a TWTA traveling wave tube amplifier 218 forming $2N_{GWactive}$ return downlink signals. The difference with FIG. 6 resides in the fact that the payload 200 includes $N_{TWTA}$ HPA power amplifiers 216 formed by $N_{TWTA}$ CAMP channel amplifiers 217 and $N_{TWTA}$ TWTA traveling wave tube amplifiers, $N_{TWTA}$ being strictly greater than $2N_{GWactive}$.

The payload 200 comprises first selection means 201 receiving in input the $2N_{GWactive}$ signals to amplify and selecting $2N_{GWactive}$ power amplifiers 217 from among the $N_{TWTA}$ present that will perform the amplification. In case of breakdown of a power amplifier (tube failure, for example), it is then possible to use another amplifier by switching the signal on this amplifier. In addition, payload 200 comprises second selection means 202 receiving as inputs the outputs of $N_{TWTA}$ power amplifiers to produce in output $2N_{GWactive}$ amplified return downlink signals that will then be filtered through an output band-pass filter then sent over a feedhorn radiating towards a reflector to form $2N_{GWactive}$ signals to $N_{GWactive}$ gateways. Such a configuration allows $N_{TWTA}$-$2N_{GWactive}$ amplifier failures to be supported. It will be noted that the same type of configuration may be provided in forward link with a redundancy of LNA low noise amplifiers.

However, such a configuration may also present certain difficulties.

SUMMARY OF THE INVENTION

In fact, it may also be that a gateway fails; in such a case, a known solution consists of introducing a redundancy in the components used in the gateway so as to be able to switch to a redundant component in case of failure of a component from one of the gateways. Of course, such redundancy leads to much higher costs.

In addition, it is also possible that a gateway is temporarily unavailable or unusable (for example, in case of adverse weather making data traffic difficult or in case of maintenance of the gateway) without it being failure.

It is an object of the present invention to provide a telecommunication network to establish radiofrequency links between gateways and ground terminals via a multispot telecommunication satellite, said network allowing the aforementioned problems to be eliminated.

For this purpose, the invention proposes a telecommunication network for establishing radiofrequency links between gateways and ground terminals via a telecommunication satellite with several spot beams, known as a multispot satellite, said network comprising:

a multispot satellite including a payload for receiving, processing and resending the telecommunication signals received by said satellite, a service area comprised of a plurality of basic coverage areas, called cells, each cell comprising a plurality of ground terminals, a plurality $N_{GWactive}$ of active gateways interconnected by a ground network, $N_{GWactive}$ being an integer, said satellite relaying the signals sent by said $N_{GWactive}$ active gateways to said cells, said network being characterized in that the network comprises $N_{GW}$ gateways, $N_{GW}$ being an integer strictly greater than the number $N_{GWactive}$ of active gateways, said $N_{GW}$ gateways being interconnected by said ground network and including said $N_{GWactive}$ active gateways such that $N_{GW}$-$N_{GWactive}$ gateways are not active.

"Gateway" is understood to refer to any central station such as a ground communication gateway connected to an Internet backbone. The gateway sends signals over a forward link that are then processed at the satellite level which amplifies the signals, transposes the signals at a different frequency (generally lower), then retransmits the signals from the satellite antenna or antennas over a downlink in the form of a plurality of spot beams or spots forming basic coverage areas or cells in which the ground terminals are situated.

Active gateway is understood to refer to a gateway that effectively participates in the broadcasting and reception of signals to and from ground user terminal cells. Conversely, a non active gateway does not participate in data traffic; on the other hand, all of the active and inactive gateways are interconnected via a ground network such as an Internet type network.

Thanks to the invention, at least one additional inactivated gateway ($N_{GW}$-$N_{GWactive} \geq 2$) is used in addition to the total number of active gateways $N_{GWactive}$ necessary to cover the service area. The gateways $N_{GW}$ are located in different locations and the means to select the payload on board the satellite enable switching from one failing or temporarily unavailable gateway to another gateway from among the $N_{GW}$-$N_{GWactive}$ gateways provided for this purpose. Such a configuration is particularly interesting not only in case of failure of a gateway but also and especially operationally in case of the temporary unavailability of a gateway, for example in case of adverse weather (rain leading to an alteration in radiofrequency signals) or in case of scheduled maintenance.

Advantageously, said network is a bidirectional network such that said satellite relays:

signals sent by said $N_{GWactive}$ active gateways to said cells, this first link forming the forward link, signals sent by said cells to said $N_{GWactive}$ active gateways, this second link forming the return link.

The present invention also provides a return payload of a multispot telecommunication satellite used in a network according to the invention, said payload comprising means to reroute a multiplexed signal from a plurality of signals sent by said cells, said signal initially being intended for one of said $N_{GWactive}$ active gateways that had become unavailable, to one of said $N_{GWactive}$ gateways including one newly activated gateway selected from among the $N_{GW}$–$N_{GWactive}$ initially inactivated gateways.

The payload according to the invention may also present one or more of the characteristics below, considered individually or according to all technically possible combinations:

In a particularly advantageous manner, the payload comprises means to amplify said multiplexed and rerouted signal, the rerouting operation being done before the amplification operation.

Advantageously, the payload comprises amplification means including $N_{TWTA}$ amplification paths able to amplify $N_{TWTA}$ multiplexed signals, each path having an input and an output, $N_{TWTA}$ being an integer such that $2N_{GWactive}$ is strictly less than $N_{TWTA}$, $2N_{GWactive}$ paths forming nominal amplification paths and $N_{TWTA}$–$2N_{GWactive}$ paths forming backup amplification paths.

Advantageously, said amplification means are formed:

either by $N_{TWTA}$ amplification units comprising $N_{TWTA}$ traveling wave tube amplifiers or $N_{TWTA}$ solid state power amplifiers, each amplification unit being able to amplify a multiplexed signal;

or by a MPA multiport amplification device comprising $N_{TWTA}$ inputs and $N_{TWTA}$ outputs and able to amplify $N_{TWTA}$ multiplexed signals.

According to a first embodiment, the payload comprises:

first means to selectively connect $2N_{GWactive}$ outputs selected from among $N_{TWTA}$ outputs to $2N_{GWactive}$ inputs able to receive $2N_{GWactive}$ multiplexed signals, the $2N_{GWactive}$ signals including $N_{GWactive}$ signals polarized according to a first polarization and $N_{GWactive}$ signals polarized according to a second polarization opposite from said first polarization, said $N_{TWTA}$ outputs being connected to said $N_{TWTA}$ inputs of said $N_{TWTA}$ amplification paths;

second means to selectively connect $2N_{GWactive}$ inputs selected from among $N_{TWTA}$ inputs to $2N_{GWactive}$ outputs, said $N_{TWTA}$ inputs being connected to said $N_{TWTA}$ outputs of said $N_{TWTA}$ amplification paths;

third means to selectively connect $2N_{GWactive}$ inputs to $2N_{GWactive}$ outputs selected from among $2N_{GW}$ outputs, said $2N_{GWactive}$ inputs being connected to said $2N_{GWactive}$ outputs of said second selective connection means.

According to a second particularly advantageous embodiment, $2N_{GW}$ is less than or equal to $N_{TWTA}$ and said payload comprises:

first means to selectively connect $2N_{GWactive}$ outputs selected from among $N_{TWTA}$ outputs to $2N_{GWactive}$ inputs able to receive $2N_{GWactive}$ multiplexed signals, the $2N_{GWactive}$ signals including $N_{GWactive}$ signals intended for a first polarization and $N_{GWactive}$ signals intended for a second polarization opposite from said first polarization, said $N_{TWTA}$ outputs being connected to said $N_{TWTA}$ inputs of said $N_{TWTA}$ amplification paths;

second means to selectively connect $2N_{GW}$ inputs selected from among $N_{TWTA}$ inputs to $2N_{GW}$ outputs, said $N_{TWTA}$ inputs being connected to said $N_{TWTA}$ outputs of said $N_{TWTA}$ amplification paths.

In a particularly advantageous manner, the payload comprises:

amplification means including $N_2$ amplification paths able to amplify $N_2$ multiplexed signals, each path having an input and an output, $N_1$ paths forming nominal amplification paths and $N_2$-$N_1$ paths forming backup amplification paths, $N_2$ and $N_1$ being integers such that the integer $N_1$ is strictly less than $N_2$, the integer $N_1$ either being equal to $2N_{GWactive}$ or equal to $N_{GWactive}$;

first means to selectively connect $N_1$ outputs selected from among $N_2$ outputs to $N_1$ inputs able to receive $N_1$ multiplexed signals, said $N_2$ outputs being connected to said $N_2$ inputs of said $N_2$ amplification paths;

second means to selectively connect $N_3$ inputs selected from among $N_2$ inputs to $N_3$ outputs, the number $N_3$ being either equal to $N_{GW}$ or equal to $2N_{GW}$, $N_3$ being less than or equal to $N_2$, said $N_2$ inputs being connected to said $N_2$ outputs of said $N_2$ amplification paths.

Advantageously, said selective connection means are formed by a plurality of R type switches.

The present invention also provides a method for reconfiguring a network in case of unavailability of one of said $N_{GWactive}$ active gateways, said method utilizing a payload according to the invention and comprising the following steps:

activation of a gateway selected from among the $N_{GW}$–$N_{GWactive}$ inactivated gateways, said selected gateway receiving at least one signal from an output of said second means, said output being connected via said second means to an output of one of said $N_{TWTA}$ or $N_2$ amplification paths, known as a reconfiguration path, said network thus comprising a group $N_{GWactive}$ of gateways including one newly activated gateway selected from among the $N_{GW}$–$N_{GWactive}$ inactivated gateways;

control of said first means to connect the input of said reconfiguration path to an input able to receive multiplexed signals intended for one of the gateways from among the group of $N_{GWactive}$ gateways including one newly activated gateway.

The present invention also provides a satellite comprising a return payload according to the invention and a forward payload comprising:

a plurality of low noise amplifiers able to amplify the multiplexed signals sent by said active gateways;

means to reroute the multiplexed signals sent by the gateway ensuring the traffic from said gateway that had become unavailable to the low noise amplifier intended to amplify the multiplexed signals sent by said gateway that had become unavailable.

BRIEF DESCRIPTION OF THE DRAWINGS

Other characteristics and advantages of the invention will emerge more clearly from the description given below, for indicative and in no way limiting purposes, with reference to the attached figures, among which:

FIG. 2 b) represents an approximation of the coverage area from FIG. 2 a) comprised of a plurality of circular spot beams;

FIG. 3 illustrates a four-color scheme for the coverage of Europe;

FIG. 4 illustrates a frequency plan in band Ka;

FIGS. 10, 11 and 12 represent a payload according to the second embodiment of the invention in three different configurations.

In all figures, common elements bear the same reference numbers.

DETAILED DESCRIPTION

Figure 1:
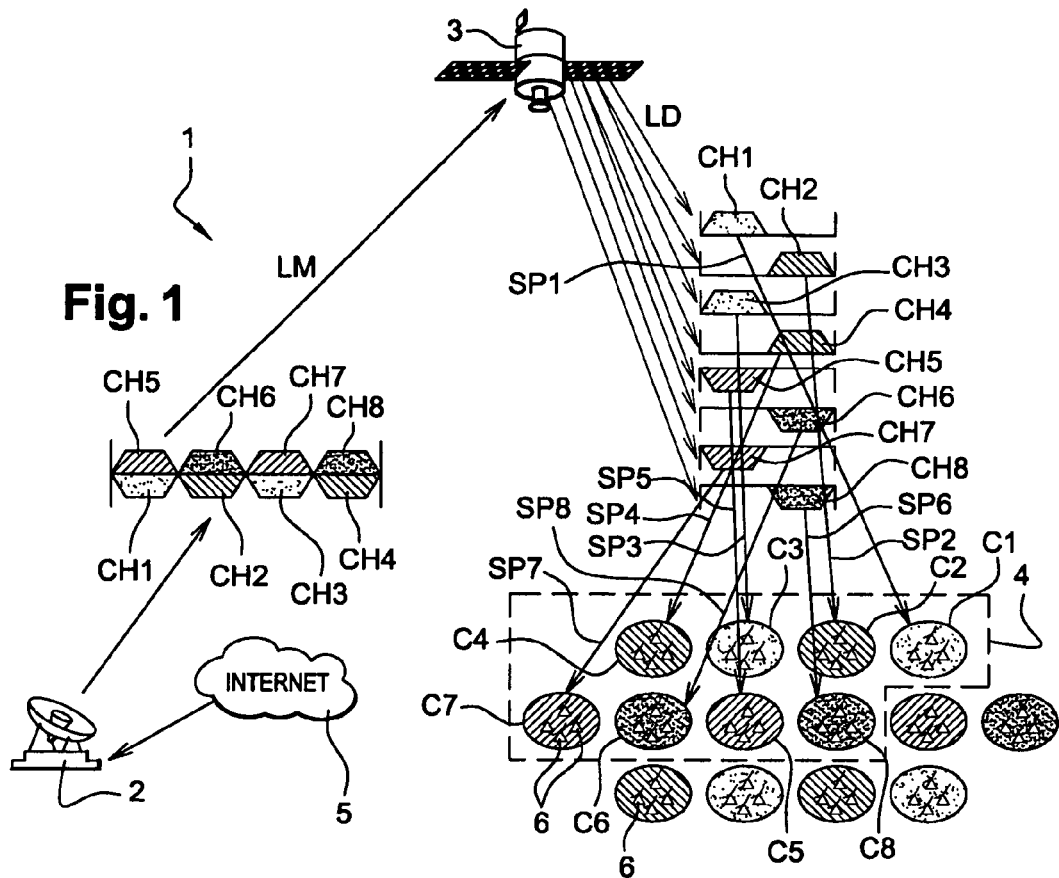
FIG. 1 is a simplified schematic representation of a multi-spot configuration.
Figure 2:
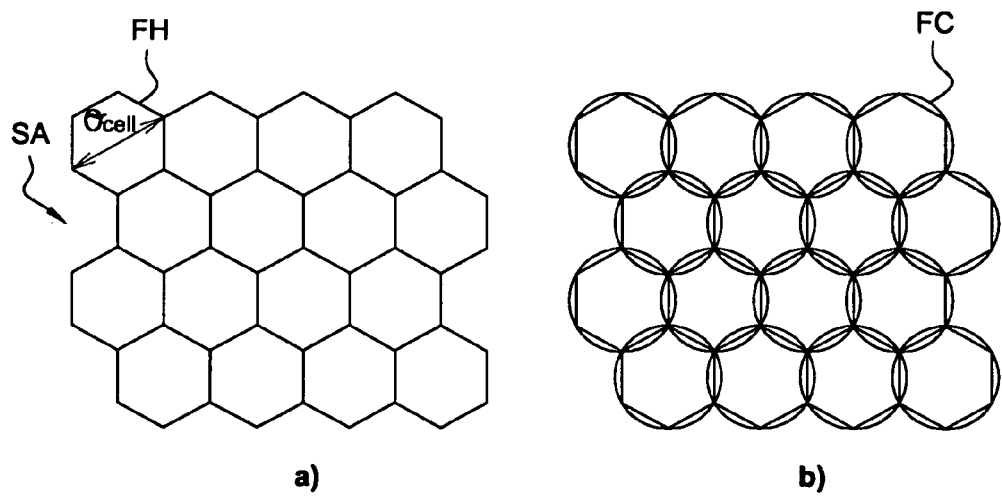
FIG. 2 a) represents an example of a coverage area comprised of a plurality of adjacent hexagons.
Figure 5:
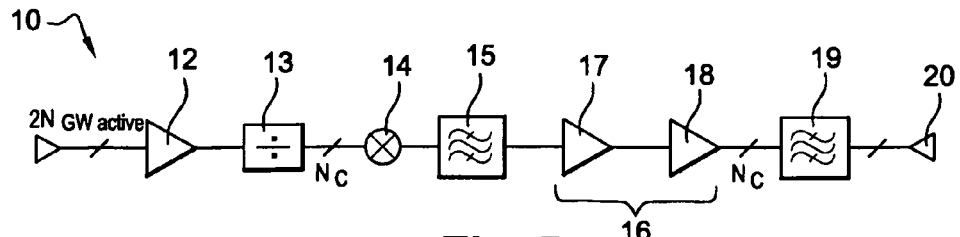
FIG. 5 is a functional block diagram of a reference payload architecture in forward link according to the prior art.

The invention relates to a telecommunication network for establishing radiofrequency links between gateways and ground terminals via a multispot telecommunication satellite. An example of such a network is represented in FIG. 1. The network according to the invention comprises a plurality $N_{GWactive}$ of active gateways (i.e., which participate in the data traffic within the network) interconnected by a ground network such as an Internet network.

Subsequently we will place ourselves in the assumption of a bidirectional network of the type that the satellite relays:

signals sent by said $N_{GWactive}$ active gateways to said cells, this first link forming the forward link, signals sent by said cells to said $N_{GWactive}$ active gateways, this second link forming the return link.

In addition, the network comprises $N_{GW}$ gateways, $N_{GW}$ being an integer strictly greater than the number $N_{GWactive}$ of active gateways (for example, $N_{GW}=N_{GWactive}+1$). The $N_{GW}$ gateways include $N_{GWactive}$ active gateways and are interconnected via the ground network mentioned above. Among these $N_{GW}$ gateways, $N_{GW}-N_{GWactive}$ gateways are not active (i.e., they do not participate in the data traffic within the network).

As we will see in further detail subsequently with reference to FIGS. 8 to 14, thanks to the invention, at least one additional inactive gateway is used in addition to the total number of active gateways $N_{GWactive}$ necessary for the service area coverage. The $N_{GW}$ gateways are located in different locations. The presence of at least one additional gateway allows switching from a failing or temporarily unavailable gateway to this gateway. Of course, such a configuration implies that all of the gateways are connected to the same telecommunication network to be interchangeable; this configuration is particularly interesting not only in case of failure of a gateway but also and especially operationally in case of the temporary unavailability of a gateway, for example in case of adverse weather (rain leading to an alteration in radiofrequency signals) or in case of scheduled maintenance.

Figure 8:
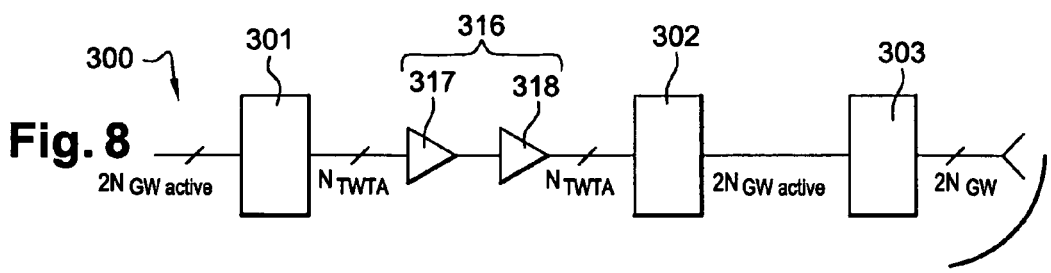
FIG. 8 schematically represents a return payload according to a first embodiment of the invention.

FIG. 8 schematically represents the part of a payload 300 in return link allowing establishment of a network according to the invention. This payload part 300 is situated between the multiplexer and the transmit filter. In a known manner, not represented, the payload 300 receives $N_c$ signals received from a plurality $N_c$ of cells comprising user terminals; these $N_c$ signals are each amplified by an LNA low noise amplifier. Each signal is then translated in frequency by a frequency converter circuit generally formed by a local oscillator and filtered by a receiver filter (of the band-pass filter type) so as to form $N_c$ channels in agreement with the downlink frequency plan on the return link. The channels intended for the same gateway (for the same polarization) are then regrouped to form a signal multiplexed by a multiplexer (at $N_c$ inputs and $2N_{GWactive}$ outputs): the structure of this multiplexed signal is identical to that of a signal sent by a gateway to the satellite on the forward uplink. Thus there are $2N_{GWactive}$ output signals from the multiplexer: the $2N_{GWactive}$ signals include $N_{GWactive}$ signals intended for a first polarization and $N_{GWactive}$ signals intended for a second polarization opposite from the first polarization (it may be a polarization with a right or left circular direction or a linear polarization with a horizontal and vertical direction). Each of the $2N_{GWactive}$ signals is amplified through an HPA high power amplifier 316 generally formed by a CAMP channel amplifier 317 and a TWTA traveling wave tube amplifier 318 forming $2N_{GWactive}$ return downlink signals. The payload 300 includes $N_{TWTA}$ HPA power amplifiers 316 (subsequently also known as $N_{TWTA}$ amplification paths) formed by $N_{TWTA}$ CAMP channel amplifiers 317 and $N_{TWTA}$ TWTA traveling wave tube amplifiers 318, $N_{TWTA}$ being strictly greater than $2N_{GWactive}$. The payload 300 thus comprises $2N_{GWactive}$ nominal amplifiers intended to amplify the $2N_{GWactive}$ signals and $N_{TWTA}-2N_{GWactive}$ redundant amplifiers.

The payload 300 also comprises first means 301 (at $2N_{GWactive}$ inputs and $N_{TWTA}$ outputs) to selectively connect $2N_{GWactive}$ outputs selected from among $N_{TWTA}$ outputs to $2N_{GWactive}$ inputs. The $2N_{GWactive}$ inputs receive $2N_{GWactive}$ multiplexed signals. For example, the first means 301 are formed by switches such as R type switches. The $N_{TWTA}$ outputs from first means 301 are connected to the $N_{TWTA}$ inputs from $N_{TWTA}$ amplification paths 316. In case of failure of one of the $2N_{GWactive}$ power amplifiers 316 (failure of a tube, for example) receiving the $2N_{GWactive}$ multiplexed signals, it is then possible to use another amplifier by rerouting the signal over another amplifier from among the $N_{TWTA}-2N_{GWactive}$ redundant amplifiers.

In addition, payload 300 comprises second means 302 (at $N_{TWTA}$ inputs and $2N_{GWactive}$ outputs) to selectively connect $2N_{GWactive}$ inputs selected from among $N_{TWTA}$ inputs to $2N_{GWactive}$ outputs, the $N_{TWTA}$ inputs being connected to the $N_{TWTA}$ outputs of the $N_{TWTA}$ amplification paths 316. The second means 302 are also, for example, made in the form of R type switches. The second means 302 receive as inputs the outputs from the $N_{TWTA}$ power amplifiers 316 to produce in output $2N_{GWactive}$ amplified return downlink signals. These $2N_{GWactive}$ are intended for $N_{GWactive}$ active gateways.

In case of failure of one of the $2N_{GWactive}$ power amplifiers 316, we have seen that another amplifier was used by rerouting the signal over this other amplifier via the first means 301. Second means 302 allow this amplification path to be connected to the output of said second means 302 corresponding to the gateway initially served by the failing amplification path.

The payload 300 also comprises third means 303 (at $2N_{GWactive}$ inputs and $2N_{GW}$ outputs) to selectively connect $2N_{GWactive}$ inputs to $2N_{GWactive}$ outputs selected from among $2N_{GW}$ outputs. The $2N_{GWactive}$ inputs from the third means 303 are connected to the $2N_{GWactive}$ outputs from the second selective connection means 302. Thus, in case of unavailability of an initially active gateway, it is possible to reroute the signal initially intended for this gateway to one of the $N_{GW}-$ $N_{GWactive}$ inactive gateways that had become active. Incidentally, it should be noted that in the example presented here, two signals will be rerouted to two outputs of the third means 303 (since the network uses two polarizations, each gateway receives two signals corresponding to the two polarizations).

Of course, it should be noted that the payload 300 also comprises NGW output filters and $2N_{GW}$ feedhorns in order to be able to potentially send to each of the $N_{GW}$ available gateways.

However, payload 300 presents a disadvantage inasmuch as the switching performed by the third means 303 is done over a signal at high power, switching in power not being desirable. Purely as an illustration, a signal in input from the amplification path has a power on the order of a milliwatt while the amplified signal has a power on the order of a hundred watts. One way to eliminate this disadvantage consists, for example, of using the mute function of the CAN channel amplifier 317 of amplification path 316 over which the switching operation will take place: the CAN 317 amplifier gain is then sufficiently reduced such that the tube amplifier 318 that follows it has practically no signal to amplify, the switching operation is thus done at reduced power.

Figure 9:
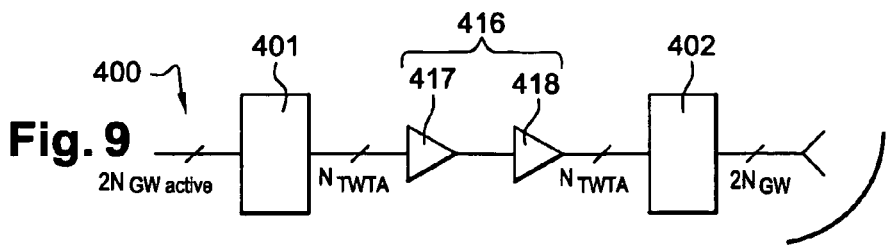
FIG. 9 schematically represents a return payload according to a second embodiment of the invention.

FIG. 9 illustrates a more elegant solution allowing the switching in power problem mentioned above to be eliminated.

FIG. 9 schematically represents the part of a payload 400 in return link allowing establishment of a network according to the invention. As in the case of FIG. 3, this part of the payload 400 is situated between the multiplexer and the output filter. In a known manner, not represented, the payload 400 receives NC signals received from a plurality NC of cells comprising user terminals; these NC signals are each amplified by an LNA low noise amplifier. Each signal is then translated in frequency by a frequency converter circuit generally formed by a local oscillator and filtered by a receiver filter (of the band-pass filter type) so as to form NC channels in agreement with the downlink frequency plan on the return link. The channels intended for the same gateway (for the same polarization) are then regrouped to form a signal multiplexed by a multiplexer (at $N_c$ inputs and $2N_{GWactive}$ outputs): the structure of this multiplexed signal is identical to that of a signal sent by a gateway to the satellite on the forward uplink. Thus there are $2N_{GWactive}$ output signals from the multiplexer: the $2N_{GWactive}$ signals include $N_{GWactive}$ signals intended for a first polarization and $N_{GWactive}$ signals intended for a second polarization opposite from the first polarization (it may be a polarization with a right or left circular direction or a linear polarization with a horizontal and vertical direction). Each of the $2N_{GWactive}$ signals is amplified through an HPA high power amplifier 417 generally formed by a CAMP channel amplifier 417 and a TWTA traveling wave tube amplifier 418 forming $2N_{GWactive}$ return downlink signals. The payload 400 includes $N_{TWTA}$ HPA high power amplifiers 416 formed by $N_{TWTA}$ CAMP channel amplifiers 417 and $N_{TWTA}$ TWTA traveling wave tube amplifiers, $N_{TWTA}$ being strictly greater than $2N_{GWactive}$. The payload 400 thus comprises $2N_{GWactive}$ nominal amplifiers intended to amplify the $2N_{GWactive}$ signals and $N_{TWTA}-2N_{GWactive}$ redundant amplifiers.

The payload 400 also comprises first means 401 (at $2N_{GWactive}$ inputs and $N_{TWTA}$ outputs) to selectively connect $2N_{GWactive}$ outputs selected from among $N_{TWTA}$ outputs to $2N_{GWactive}$ inputs. The $2N_{GWactive}$ inputs receive $2N_{GWactive}$ multiplexed signals. For example, the first means 401 are formed by switches such as R type switches. The $N_{TWTA}$ outputs from first means 401 are connected to the $N_{TWTA}$ inputs from $N_{TWTA}$ amplification paths 416. In case of failure of one of the $2N_{GWactive}$ power amplifiers 416 (failure of a tube for example) receiving the $2N_{GWactive}$ multiplexed signals, it is then possible to use another amplifier by rerouting the signal over another amplifier from among the $N_{TWTA}-2N_{GWactive}$ redundant amplifiers.

The payload 400 also comprises second means 402 (at $N_{TWTA}$ inputs and $2N_{GW}$ outputs) to selectively connect $2N_{GW}$ inputs selected from among $N_{TWTA}$ inputs to $2N_{GW}$ outputs. The $N_{TWTA}$ inputs of the second means 402 are connected to the $N_{TWTA}$ outputs of the $N_{TWTA}$ amplification paths 416. The second means 402 are, for example, made in the form of R type switches.

In case of failure of one of the $2N_{GWactive}$ power amplifiers 416 (failure of a tube, for example) receiving $2N_{GWactive}$ multiplexed signals, it is possible to use another amplifier by rerouting the signal via first means 401 over another amplification path from among the $N_{TWTA}-2N_{GWactive}$ redundant amplifiers. Second means 402 allow this amplification path to be connected to the output of the second means 402 corresponding to the gateway initially served by the failing amplification path.

In case of unavailability of one of the $N_{GWactive}$ active gateways, the network reconfiguration method is as follows:

the method starts by activating a gateway selected from among the $N_{GW}-N_{GWactive}$ initially inactivated gateways. The selected gateway is able to receive a signal issued from an output from the second means 402, this output being connected via the second means 402 to an output from one of the $N_{TWTA}$ amplification paths that we are calling the reconfiguration path. The network thus comprises a group of $N_{GWactive}$ active gateways including a newly activated gateway selected from among the $N_{GW}-N_{GWactive}$ inactivated gateways;

the first means 401 are controlled to connect the input of the reconfiguration path to an input able to receive multiplexed signals intended for one of the gateways from among the group of $N_{GWactive}$ gateways including one newly activated gateway.

It will be noted that two solutions are possible: either the reconfiguration path is powered after activation of the selected gateway or the potential reconfiguration path or paths is or are always powered (on standby) to ensure that the path or paths is or are ready to be used. In the first case, a warming period connected to the powering of the reconfiguration path is introduced. In the second case, this period is eliminated (on the other hand, maintaining a certain powering is required, which induces higher consumption).

Thus, it is entirely possible to arrange for the reconfiguration path to be put on standby when a gateway maintenance operation is scheduled: thus the period induced by warming the amplification path is avoided.

It will be noted that reconfiguration depends on the type of selective connection means used: for example, one may directly connect the input of the reconfiguration path to the input able to receive multiplexed signals initially intended for the unavailable gateway. One may also connect the input of the reconfiguration path to an input different from the input able to receive multiplexed signals initially intended for the unavailable gateway. In this case, another switching will have to take place (see for example FIGS. 10 to 13).

This reconfiguration is very rapid since, even in the case where the reconfiguration path is not on standby, powering of the reconfiguration path and switching of the first means 401 only takes several minutes (typically 4 minutes).

Thanks to the payload 400 according to the invention, it is thus possible to reroute the signals initially intended for an unavailable gateway to a substitution gateway without per-forming a switching in power (the switching of second means 402 is done upstream from amplification paths 416, so at low power).

Traffic is thus redirected without reducing the gain of the CAMP amplifiers 417 (or even completely shutting down the amplification paths 416).

According to this embodiment, a distinction is no longer made between the nominal amplifiers and the redundant amplifiers, a redundant amplifier may become a nominal amplifier to satisfy a replacement gateway.

The operating condition of a network using a payload such as payload 400 is that number $2N_{GW}$ is less than or equal to the total number $N_{TWTA}$ of amplifiers. Here it should be noted that the network according to the invention allows a number $N_{GW}$ of gateways to be used that is not doubled with relation to the number of active gateways.

The problematics linked on the one hand to the reconfiguration linked to the loss of an amplifier and on the other hand to the reconfiguration linked to the unavailability of a gateway are two decorrelated problematics.

It will be noted that, in the embodiment presented here, in case of unavailability of a gateway, there are two reconfiguration paths, each receiving the multiplexed signals according to a polarization initially intended for the unavailable gateway (the network in fact uses two polarizations, each gateway receiving two signals corresponding to the two polarizations).

As for the payload 300 of FIG. 8, it will also be noted that the payload 400 of course also comprises $N_{GW}$ output filters and $2N_{GW}$ feedhorns in order to be able to potentially send to each of the $N_{GW}$ available gateways.

Figure 10:
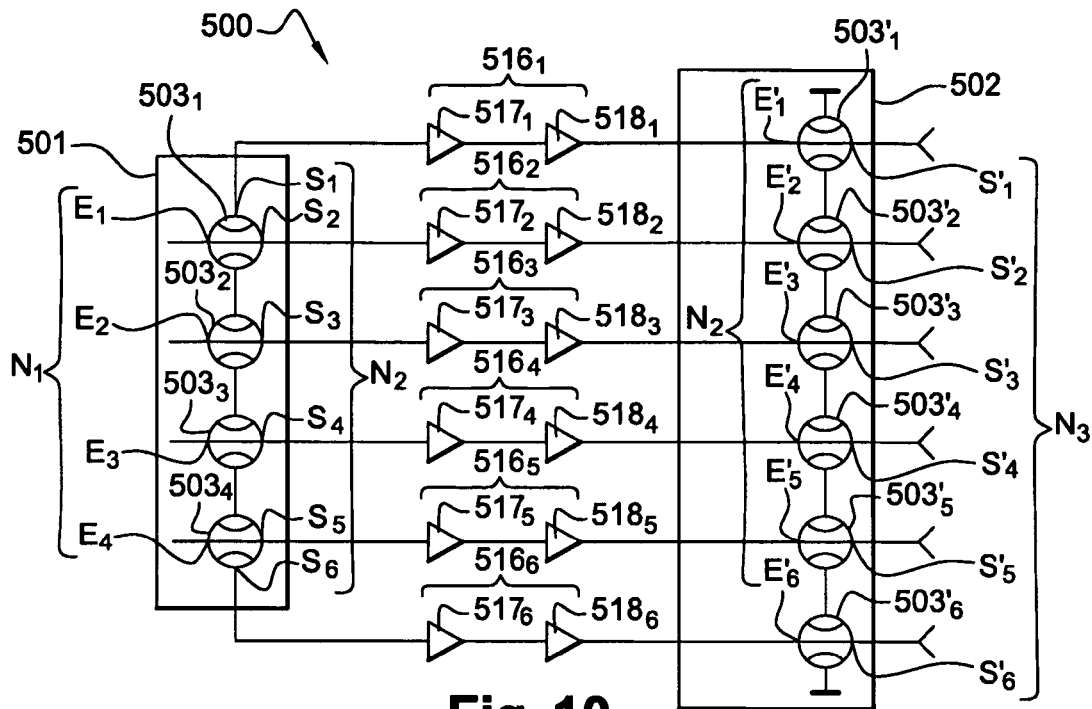
Figure 11:
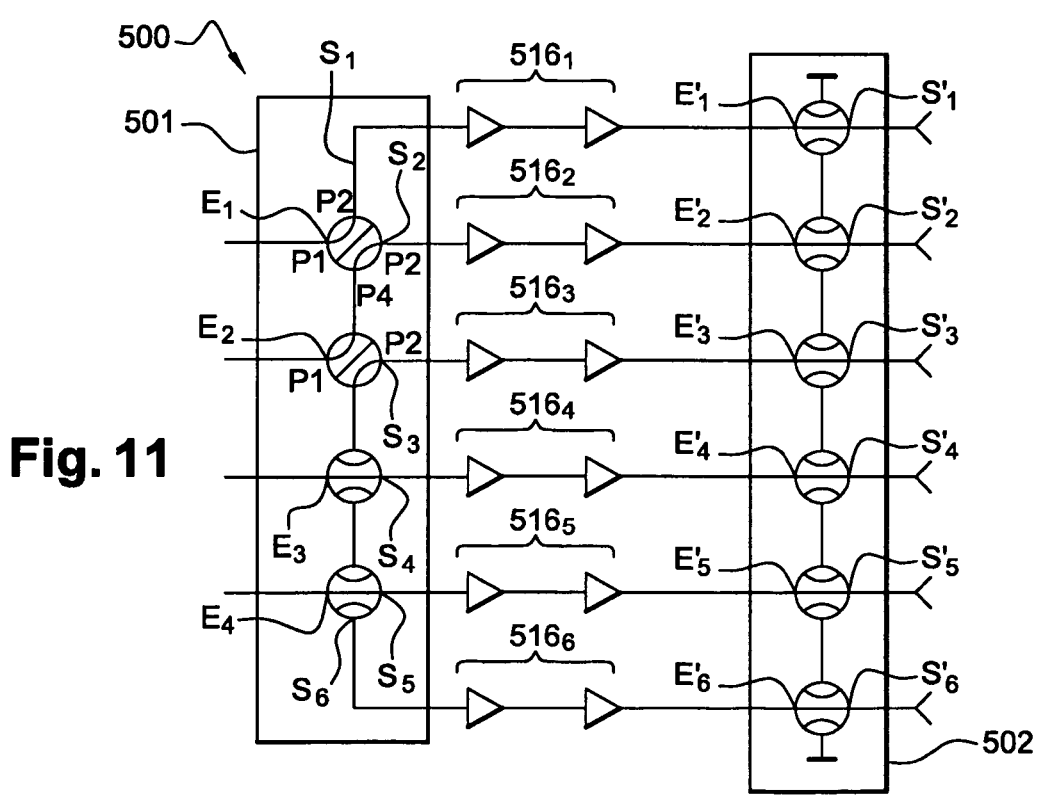

FIGS. 10 to 12 illustrate a simplified example of a payload 500 according to the second embodiment of the invention (the case of payload 400 such as represented in FIG. 9) in three different configurations. For simplification, we will not introduce (contrary to payload 400) the requirement linked to the two amplification systems (one system per polarization) in the case of FIGS. 10 to 13, the principle remains the same depending on whether one operates with one amplification system or two amplification systems.

Figure 13A:
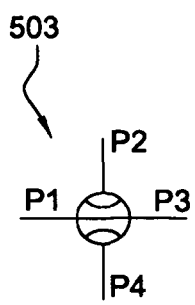
FIGS. 13a, 13b, 13c and 13d represent an R type switch in its four possible positions.
Figure 13C:
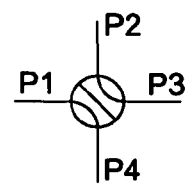
Figure 13B:
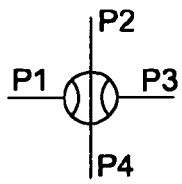
Figure 13D:
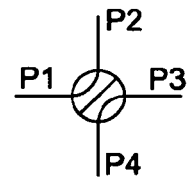

Before describing FIGS. 10 to 12, we recall with reference to FIGS. 13A to 13D the operation of an R type waveguide switch 503. FIGS. 13A to 13D represent the four possible configurations of an R type switch. R type switches are adapted to turn by 45° steps to connect any given port to any of the three other ports, only the case of the connection between opposite ports involves insulation of each of the other ports; these switches have four distinct connection configurations. This switch has four ports P1, P2, P3 and P4 (clockwise numbering) and one switching means adapted to:
- connect two opposite ports by insulating the others (FIGS. 13A and 13D);
- connect two adjacent ports as well as the other ports (FIGS. 13A and 13D).

Payload 500 comprises first means 501 comprising $N_1$ ($N_1=4$ in our example) inputs E ($E_1$ to $E_{N1}$ with $N_1=4$) and $N_2$ ($N_2=6$ in our example) outputs S ($S_1$ to $S_{N2}$ with $N_2=6$). The $N_1$ inputs are able to receive $N_1$ multiplexed signals; in comparison with the example from FIG. 9, N1 is equal to $2N_{GWactive}$. However, if a payload is used with two amplification systems (one system per polarization), $N_1$ is equal to $N_{GWactive}$ for each amplification system. The invention thus applies to both a payload with $2N_{GWactive}$ inputs and a payload organized into two amplification systems each having $N_{GWactive}$ inputs. First means 501 comprise a series of $N_1$ R type switches 503 ($503_1$ to $503_{N1}$ with $N_1=4$): with reference to FIGS. 13A to 13C, the $N_1$ inputs from first means 501 correspond to ports P1 of switches 503. In addition, each port P4 of a switch is connected to port P2 of the next switch. The $N_2$ outputs correspond to ports P3 of switches 503 as well as to port P2 of switch $503_1$ situated at a first end of the series of switches 503 and to port P4 of switch $503_4$ situated at a second end of the series of switches 503. $N_2$ is an integer strictly greater than $N_1$; in comparison with the example of FIG. 9, N2 is equal to $N_{TWTA}$. If a payload is used with two amplification systems (one system per polarization), $N_2$ is equal to $N_{TWTA}/2$ for each amplification system.

Payload 500 includes $N_2$ power amplifiers 516 or amplification paths ($516_1$ to $516_{N2}$ with $N_2=6$) formed by $N_2$ CAMP channel amplifiers 517 ($517_1$ to $517_{N2}$ with $N_2=6$) and $N_2$ TWTA traveling wave tube amplifiers 518 ($518_1$ to $518_{N2}$ with $N_2=6$). The $N_2$ outputs are connected to the $N_2$ inputs from $N_2$ amplification paths 516. Thus there are $N_2-N_1$ backup amplifiers 516 (amplifiers $516_1$ and $516_6$ in our example). In the configuration from FIG. 10, first means 501 are such that inputs $E_1$ to $E_4$ are connected to outputs $S_2$ to $S_5$.

Payload 500 in addition comprises second means 502 comprising $N_2$ inputs E' ($E'_1$ to $E'_{N2}$ with $N_2=6$) and $N_3$ ($N_3=6$ in our example) outputs S' ($S'_1$ to $S'_{N2}$ with $N_2=6$). The $N_2$ inputs are able to receive $N_2$ amplified multiplexed signals. Number $N_3$ is less than or equal to the total number $N_2$ of amplifiers (in our example $N_3=N_2$).

The N2 inputs $E'_1$ to $E'_{N2}$ from second means 502 are connected to N2 outputs from $N_2$ amplification paths $516_1$ and $516_{N2}$.

The $N_3$ outputs $S'_1$ to $S'_{N3}$ from second means 502 are connected to N2 inputs from $N_2$ amplification paths $E'_1$ and $E'_{N2}$.

Second means 502 comprise a series of $N_3$ R type switches 503' ($503'_1$ to $503'_{N3}$ with $N_3=6$): with reference to FIGS. 13A to 13C, $N_1$ inputs from second means 502 correspond to ports P1 of switches 503'. In addition, each port P4 of a switch is connected to port P2 of the following switch. The $N_3$ outputs correspond to ports P3 of switches 503'. The $N_3$ outputs correspond to the output ports allowing signals to be sent to gateways. In comparison with the example of FIG. 9, N3 is equal to $2N_{GW}$. However, if a payload is used with two amplification systems (one system per polarization), $N_3$ is equal to $N_{GW}$. In FIG. 10, R type switches are such that their port P1 is electrically connected to their port P3.

In the example, inactive gateways are gateways connected to outputs $S'_1$ and $S'_6$.

The case of unavailability (maintenance, adverse weather, etc.) of one of the $N_{GWactive}$ active gateways (in our example the gateway connected to output $S'_3$) is illustrated by the passage from FIG. 10 to FIG. 11.

The method starts by activating a gateway selected from among the $N_{GW}-N_{GWactive}$ initially inactivated gateways. In our example, this is the gateway connected to the output $S'_1$. This output $S'_1$ is connected via input $E'_1$ from the second means 502 to the output of the amplification path $516_1$ that we are calling the reconfiguration path. This reconfiguration path $516_1$ is powered (as we mentioned before, this step is not necessary if the reconfiguration path is already on standby). First means 501 are then controlled to connect the input from the reconfiguration path to the input $E_1$ (the first R switch is turned so that its port P1 is connected to its port P2 and its port P3 is connected to its port P4) able to receive multiplexed signals initially intended for the gateway receiving signals from output $S'_2$. First means 501 are also controlled to connect the input from the amplification path $516_2$ to input $E_2$ (the second R switch is turned so that its port P1 is connected to its port P2 and its port P3 is connected to its port P4) able to receive multiplexed signals initially intended for the gateway that had become unavailable. Here it may be seen that reconfiguration of the network requires two switchings at the level of the first means 501 (however, more sophisticated switching means allow the input from the reconfiguration path to be directly connected to the input $E_2$ able to receive multiplexed signals initially intended for the gateway that had become unavailable so as to eliminate this "domino" effect). It is also observed that this reconfiguration does not require any action on the second means 502 and that switchings are performed over low power signals. In addition, it will be noted that $N_2$–$N_1$ backup amplifiers 516 have changed: these are amplifiers 516$_1$ and 516$_6$ in the case of FIG. 10; these are amplifiers 516$_3$ and 516$_6$ in our example.

The case of a failure of one of the $N_2$ power amplifiers 516 (failure of a tube, for example) is illustrated by the passage from FIG. 10 to FIG. 12. In the case of FIG. 12, tube 518$_1$ is failing and tube 518$_2$ becomes the backup tube. In this case, all of the R switches from the first means 501 are turned so that their port P1 is connected to their port P4 and that their port P2 is connected to their port P3. Furthermore, all of the R switches from the second means 502 are turned so that their port P1 is connected to their port P2 and that their port P3 is connected to their port P4. In this case, the amplification path 518$_2$ becomes the backup amplification path. Outputs S'$_2$ to S'$_5$ from the second means 502 sending signals to gateways remain unchanged. Thus it is observed that the failure of a tube (or an amplification path) does not lead to reconfiguration of the active gateways.

Figure 6:
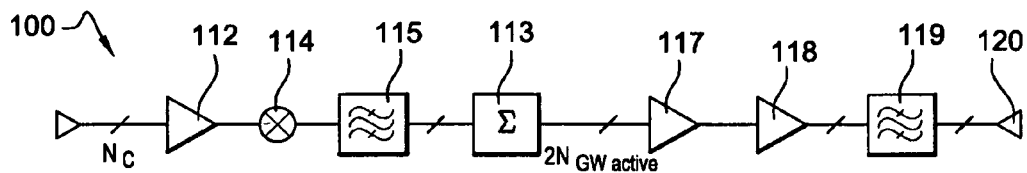
FIG. 6 is a functional block diagram of a reference payload architecture in return link according to the prior art.
Figure 7:
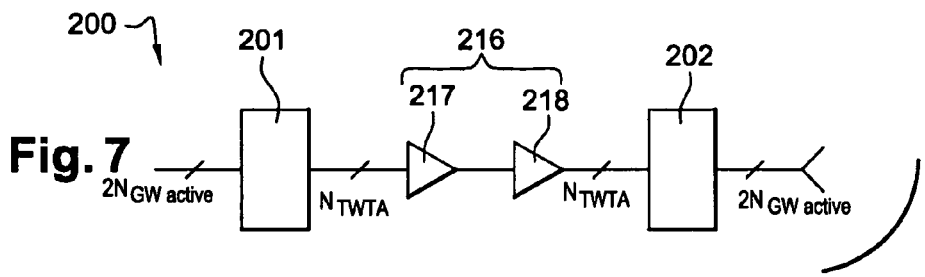
FIG. 7 schematically represents the part of a return payload situated between the multiplexer and the output filter and including CAMPs and redundant TWTA tubes according to the prior art.

The invention was more particularly described in the case of a return payload. However, it may also be desirable to apply the same principle to a forward payload at the level of the low noise amplifiers (such as the LNA amplifiers 112 represented in FIG. 6). In this case, the forward payload comprises:

a plurality of low noise amplifiers able to amplify the multiplexed signals sent by the active gateways;

means to reroute the multiplexed signals sent by the gateway ensuring the traffic from the gateway that had become inactive to the low noise amplifier intended to amplify the multiplexed signals sent by the gateway that had become unavailable.

Of course, the invention is not limited to the embodiment that has just been described.

Thus, the invention was more particularly described in the case of an amplifier formed by a CAMP followed by a TWTA. However, it will be noted that the invention also applies to the case of an SSPA amplifier or MPA type equipment.

What is claimed is:

1. A return payload of a multispot telecommunication satellite in a telecommunication network for establishing radiofrequency links between gateways and ground terminals via a telecommunication satellite with several spot beams, the network including: a multispot satellite including a payload for receiving, processing and resending the telecommunication signals received by the satellite; a service area comprised of a plurality of basic coverage areas, called cells, each cell comprising a plurality of ground terminals; a plurality $N_{GWactive}$ of active gateways interconnected by a ground network, $N_{GWactive}$ being an integer, the satellite relaying the signals sent by said $N_{GWactive}$ active gateways to the cells; $N_{GW}$–$N_{GWactive}$ gateways, $N_{GW}$ being an integer strictly greater than the number $N_{GWactive}$ of active gateways, said $N_{GW}$ gateways being interconnected by said ground network and including said $N_{GWactive}$ active gateways such that the $N_{GW}$–$N_{GWactive}$ gateways are not active, wherein the network is a bidirectional network such that the satellite relays: signals sent by the $N_{GWactive}$ active gateways to the cells to define first link forming a forward link, and signals sent by the cells to the $N_{GWactive}$ active gateways to define a second link forming a return link; the payload comprising:

means to reroute a multiplexed signal from a plurality of signals sent by the cells, the multiplexed signal initially being intended for one of the $N_{GWactive}$ active gateways that had become unavailable, to one of the $N_{GWactive}$ gateways including one newly activated gateway selected from among the $N_{GW}$–$N_{GWactive}$ initially inactivated gateways; and means to amplify said multiplexed and rerouted signal, the rerouting operation being performed before the amplification operation.

2. The payload according to claim 1 wherein the amplification means including includes $N_{TWTA}$ amplification paths able to amplify $N_{TWTA}$ multiplexed signals, each path having an input and an output, $N_{TWTA}$ being an integer such that $2N_{GWactive}$ is strictly less than $N_{TWTA}$, $2N_{GWactive}$ paths forming nominal amplification paths and $N_{TWTA}$–$2N_{GWactive}$ paths forming backup amplification paths.

3. The payload according to claim 2 wherein the amplification means are formed:

either by $N_{TWTA}$ amplification units comprising $N_{TWTA}$ traveling wave tube amplifiers (317, 417) or $N_{TWTA}$ solid state power amplifiers, each amplification unit being able to amplify a multiplexed signal; or by an MPA multiport amplification device comprising $N_{TWTA}$ inputs and $N_{TWTA}$ outputs and able to amplify $N_{TWTA}$ multiplexed signals.

4. The payload according to claim 2 further comprising:

first means to selectively connect $2N_{GWactive}$ outputs selected from among $N_{TWTA}$ outputs to $2N_{GWactive}$ inputs able to receive $2N_{GWactive}$ multiplexed signals, the $2N_{GWactive}$ signals including $N_{GWactive}$ signals intended for a first polarization and $N_{GWactive}$ signals intended for a second polarization opposite from said first polarization, said $N_{TWTA}$ outputs being connected to said $N_{TWTA}$ inputs of said $N_{TWTA}$ amplification paths;

second means to selectively connect $2N_{GWactive}$ inputs selected from among $N_{TWTA}$ inputs to $2N_{GWactive}$ outputs, said $N_{TWTA}$ inputs being connected to said $N_{TWTA}$ outputs of said $N_{TWTA}$ amplification paths;

third means to selectively connect $2N_{GWactive}$ inputs to $2N_{GWactive}$ outputs selected from among $2N_{GW}$ outputs, said $2N_{GWactive}$ inputs being connected to said $2N_{GWactive}$ outputs of said second selective connection means.

5. The payload according to claim 4 wherein the first, second and third means are formed by a plurality of R type switches.

6. The payload according to claim 2 wherein $2N_{GW}$ is less than or equal to $N_{TWTA}$, the payload comprising:

first means to selectively connect $2N_{GWactive}$ outputs selected from among $N_{TWTA}$ outputs to $2N_{GWactive}$ inputs able to receive $2N_{GWactive}$ multiplexed signals, the $2N_{GWactive}$ signals including $N_{GWactive}$ signals intended for a first polarization and $N_{GWactive}$ signals intended for a second polarization opposite from said first polarization, said $N_{TWTA}$ outputs being connected to said $N_{TWTA}$ inputs of said $N_{TWTA}$ amplification paths;

second means to selectively connect $2N_{GW}$ inputs selected from among $N_{TWTA}$ inputs to $2N_{GW}$ outputs, said $N_{TWTA}$ inputs being connected to said $N_{TWTA}$ outputs of said $N_{TWTA}$ amplification paths.

7. The payload according to claim 6 wherein the first and second means are formed by a plurality of R type switches.

8. A reconfiguration method of a network in case of unavailability of one of said $N_{GWactive}$ active gateways, the method utilizing a payload according to claim 6 comprising the following steps:

activating a gateway selected from among the $N_{GW}$–$N_{GWactive}$ inactivated gateways, the selected gateway receiving at least one signal from an output of the second means, the output being connected via the second means to an output of one of said $N_{TWTA}$ or $N_2$ amplification paths, known as a reconfiguration path, the network thus comprising a group $N_{GWactive}$ of gateways including one newly activated gateway selected from among the $N_{GW}$–$N_{GWactive}$ inactivated gateways;

controlling the first means to connect the input of said reconfiguration path to an input able to receive multiplexed signals intended for one of the gateways from among the group of $N_{GWactive}$ gateways including one newly activated gateway.

9. The payload according to claim 1 wherein the amplification means includes $N_2$ amplification paths able to amplify $N_2$ multiplexed signals, each path having an input and an output, $N_1$ paths forming nominal amplification paths and $N_2$–$N_1$ paths forming backup amplification paths, $N_2$ and $N_1$ being integers such that the integer $N_1$ is strictly less than $N_2$, the integer $N_1$ either being equal to $2N_{GWactive}$ or equal to $N_{GWactive}$;

first means to selectively connect $N_1$ outputs selected from among $N_2$ outputs to $N_1$ inputs able to receive $N_1$ multiplexed signals, said $N_2$ outputs being connected to said $N_2$ inputs of said $N_2$ amplification paths;

second means to selectively connect $N_3$ inputs selected from among $N_2$ inputs to $N_3$ outputs, the number $N_3$ being either equal to $N_{GW}$ or equal to $2N_{GW}$, $N_3$ being less than or equal to $N_2$, said $N_2$ inputs being connected to said $N_2$ outputs of said $N_2$ amplification paths.

10. The payload according to claim 9 wherein the first and second means are formed by a plurality of R type switches.

11. A reconfiguration method of a network in case of unavailability of one of said $N_{GWactive}$ active gateways, the method utilizing a payload according to claim 9 comprising the following steps:

activating a gateway selected from among the $N_{GW}$–$N_{GWactive}$ inactivated gateways, the selected gateway receiving at least one signal from an output of the second means, the output being connected via the second means to an output of one of said $N_{TWTA}$ or $N_2$ amplification paths, known as a reconfiguration path, the network thus comprising a group $N_{GWactive}$ of gateways including one newly activated gateway selected from among the $N_{GW}$–$N_{GWactive}$ inactivated gateways;

controlling the first means to connect the input of said reconfiguration path to an input able to receive multiplexed signals intended for one of the gateways from among the group of $N_{GWactive}$ gateways including one newly activated gateway.

12. A satellite comprising a return payload according to claim 1 and a forward payload comprising:

a plurality of low noise amplifiers able to amplify the multiplexed signals sent by said active gateways;

means to reroute the multiplexed signals sent by the gateway ensuring the traffic of said gateway that had become unavailable to the low noise amplifier intended to amplify the multiplexed signals sent by said gateway that had become unavailable.

13. A satellite comprising:

a return payload of a multispot telecommunication satellite in a telecommunication network for establishing radiofrequency links between gateways and ground terminals via a telecommunication satellite with several spot beams, the network including: a multispot satellite including a payload for receiving, processing and resending the telecommunication signals received by the satellite; a service area comprised of a plurality of basic coverage areas, called cells, each cell comprising a plurality of ground terminals; a plurality $N_{GWactive}$ of active gateways interconnected by a ground network, $N_{GWactive}$ being an integer, the satellite relaying the signals sent by said $N_{GWactive}$ active gateways to the cells; $N_{ow}$–$N_{GWactive}$ gateways, $N_{GW}$ being an integer strictly greater than the number $N_{GWactive}$ of active gateways, said $N_{GW}$ gateways being interconnected by said ground network and including said $N_{GWactive}$ active gateways such that the $N_{GW}$–$N_{GWactive}$ gateways are not active, wherein the network is a bidirectional network such that the satellite relays: signals sent by the $N_{GWactive}$ active gateways to the cells to define first link forming a forward link, and signals sent by the cells to the $N_{GWactive}$ active gateways to define a second link forming a return link; the return payload including: means to reroute a multiplexed signal from a plurality of signals sent by the cells, the multiplexed signal initially being intended for one of the $N_{GWactive}$ active gateways that had become unavailable, to one of the $N_{GWactive}$ gateways including one newly activated gateway selected from among the $N_{GW}$–$N_{GWactive}$ initially inactivated gateways; and means to amplify said multiplexed and rerouted signal, the rerouting operation being performed before the amplification operation; and a forward payload including a plurality of low noise amplifiers able to amplify the multiplexed signals sent by said active gateways, and means to reroute the multiplexed signals sent by the gateway ensuring the traffic of said gateway that had become unavailable to the low noise amplifier intended to amplify the multiplexed signals sent by said gateway that had become unavailable.

\* \* \* \* \*